United States Patent [19]
Choi et al.

[11] Patent Number: 5,728,938
[45] Date of Patent: Mar. 17, 1998

[54] NOISE MEASURING DEVICE FOR A DIFFERENTIAL GEAR ASSEMBLY

[75] Inventors: Eun-O Choi, Kwach'ŏn; Han-Song Jong, Seoul, both of Rep. of Korea

[73] Assignee: Kia Motors Corporation, Seoul, Rep. of Korea

[21] Appl. No.: 697,240

[22] Filed: Aug. 21, 1996

[30] Foreign Application Priority Data

Jul. 26, 1996 [KR] Rep. of Korea ............... 96-30565

[51] Int. Cl.$^6$ ............................................. G01M 13/02
[52] U.S. Cl. .................................... 73/593; 73/162
[58] Field of Search .................... 73/593, 162, 118.1, 73/660

[56] References Cited

U.S. PATENT DOCUMENTS

| | | | |
|---|---|---|---|
| 3,127,767 | 4/1964 | Kamp | 73/593 |
| 3,894,429 | 7/1975 | Konersmann et al. | 73/162 |
| 4,196,620 | 4/1980 | Dapiran | 73/162 |
| 4,236,407 | 12/1980 | Alpini et al. | 73/118.1 |
| 4,649,743 | 3/1987 | Sugimoto et al. | 73/593 |
| 4,788,856 | 12/1988 | Felger | 73/118.1 |
| 5,574,646 | 11/1996 | Kawasaki et al. | 73/660 |

*Primary Examiner*—John E. Chapman

[57] ABSTRACT

A noise measuring device for a differential gear assembly which measures a noise generated from a differential gear under simulated driving conditions. The noise measuring device for the differential gear assembly includes: a driving motor for rotating a differential gear in a differential assembly; a braking apparatus comprised of a brake drum, a brake lining, and a brake operation knob, for providing a load of a driving condition to the differential gear; and sound sensing apparatus comprised of a sound level meter and a frequency analyzer, for measuring a noise from the differential assembly; and a driving condition sensing apparatus comprised of a torque sensor, an RPM sensor, and an A/D converter, for sensing the driving condition through the differential gear.

1 Claim, 1 Drawing Sheet

5,728,938

NOISE MEASURING DEVICE FOR A DIFFERENTIAL GEAR ASSEMBLY

BACKGROUND OF THE INVENTION

The present invention relates to a device for a differential gear assembly. More particularly, this invention relates to a device for measuring noise generated from a differential gear under simulated driving condition.

Generally, a rear wheel drive includes a differential gear which rotates faster than the tires on the outer radius and rotates slower than the tires on the inner radius when the vehicle curves, so as to prevent an uneven load to the tires.

The differential gear and a final gear are made as one body. Four bevel gears face each other in the differential gear which includes two side gears connected to the right and left axles, and two pinion gears.

Accordingly, when the vehicle travels in straight line, the differential gear including the final gear in one body rotates, thereby turning the right and left axles at the same speed. However, the pinion rotates when the vehicle travels in a curved line, so that the right and left axles turn at different speeds. As a result, the turning of the tires on the outer radius is faster than that of the tires on the inner radius.

The differential gear made of four gears is an assembly of a differential carrier made of a malleable cast iron or aluminum alloy, and is fixed to a rear tire's subframe positioned in a drive shaft.

Recently, to achieve quiet running of the vehicle, research for reducing noise has been studied together with other research for reducing the noise generated from the differential gear assembly.

Most of all, ratio of the noise of the differential gear assembly to overall noise of the vehicle, magnitude of the noise of the differential gear assembly, and ratio of each noise from every part of the gear assembly are first analyzed.

However, conventionally, since the noise measuring device for the differential gear assembly is mounted in the vehicle, an unnecessary noise of another device in the vehicle is mixed with the noise of the differential gear assembly. As a result, when measuring the noise, the noise of the differential gear assembly cannot be separated from the unnecessary noise.

SUMMARY OF THE INVENTION

It is an object of the present invention to provide a noise measuring device for a differential gear assembly which separates the differential gear assembly from a vehicle, measures a noise under the same conditions of a torque and a load as in a normal running of the vehicle having the differential gear assembly, to thereby accurately measure the noise from the differential gear assembly as well as noise from every part of the vehicle.

In order to achieve this object, the noise measuring device for the differential gear assembly which generates noise under the same condition as the vehicle's running, includes: a fixed jig for fixing front and rear parts of a differential gear assembly having a differential gear; a driving motor for rotating a drive shaft of the differential gear; and a braking means for providing a load to a driven shaft of the differential gear.

The noise measuring device further includes a driving motor controller which controls a driving speed of the driving motor according to an electrical control.

The braking means includes: a brake drum coupled with the driven shaft as one body; a brake lining for covering a periphery surface of the brake drum; and a brake controller which provides a load to the differential gear by giving a tensile stress to the brake lining.

The drive shaft is connected with the driving motor and the driving belt.

The noise measuring device further includes: a sound sensing means which is installed adjacent to the differential gear, and generates an electrical signal proportional to a magnitude of the noise; and a frequency analyzer which receives an output signal from the sound sensing means, and then analyzes the output signal to determine its characteristics.

A torque sensor and a revolution per minute (hereinafter referred to as RPM) sensor are attached between the propulsive shaft and the driving motor.

The noise measuring device further includes: an analog-to-digital (hereinafter referred to as A/D) converter for analyzing the torque and RPM of the propulsive shaft, after receiving the output signals of the torque and RPM sensors.

Therefore, if the characteristics of the noise about the RPM and torque of the differential gear are analyzed through the sound sensing means, the frequency analyzer, and the A/D converter, more effective data is obtained.

BRIEF DESCRIPTION OF THE ATTACHED DRAWINGS

These and other features, aspects, and advantages of the present invention will become better understood with regard to the following description, appended claims, and accompanying drawings wherein:

FIG. 1 shows the noise measuring device for the differential gear assembly in accordance with a preferred embodiment of the present invention.

DETAILED DESCRIPTION OF THE INVENTION

Figure 1:
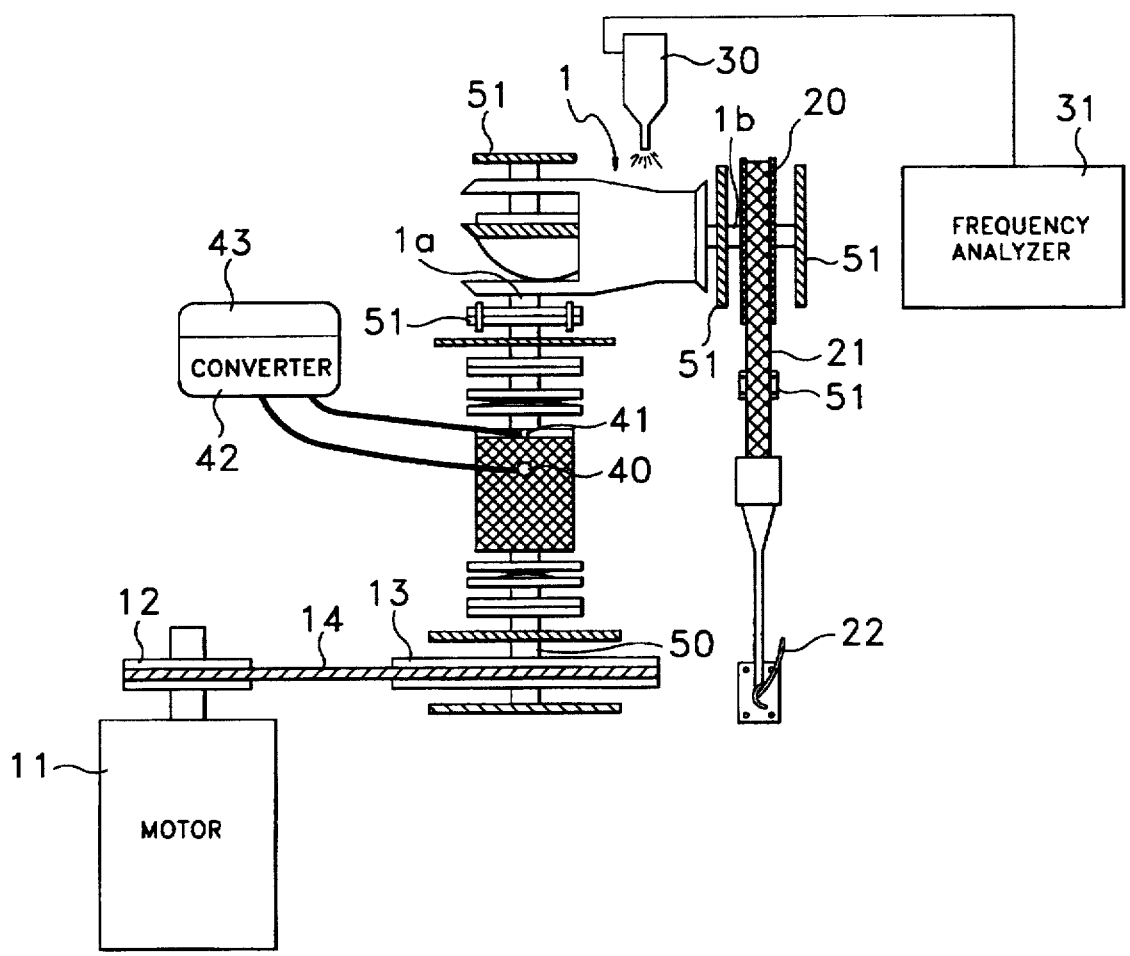

As shown in FIG. 1, the noise measuring device for the differential gear assembly includes: a driving means comprised of a driving motor 11, for rotating a differential gear in a differential assembly 1; a braking means comprised of a brake drum 20, a brake lining 21, and a brake operation knob 22, for providing a load of a navigation condition to the differential gear; a sound sensing means comprised of a sound level meter 30 and a frequency analyzer 31, for measuring noise from the differential assembly; and a navigation condition sensing means comprised of a torque sensor 40, RPM sensor 41, and an A/D converter 42, for sensing the navigation condition through the differential gear.

In addition, as a means for transmitting a rotation force of the driving motor 11 to a main spindle 50 meshed with the differential gear, the noise measuring device according to the present invention further includes: a driving pulley 12 mounted to a drive shaft of the motor 11; a driven pulley 13 mounted to the main spindle 50; a V belt 14 for coupling the driving pulley 12 with the driven pulley 13; and jigs 51 for fixing the above-mentioned parts.

The A/D converter 42 is connected to a computer system 43 (not shown) for graphically displaying a torque and RPM of the main spindle 50.

First, both sides of a propulsive shaft 1a of the differential assembly 1 engage with the main spindle 50 at the same time that a brake drum 20 engages with the driven shaft 1b, and then they are fixed by using the jigs 51. After that, the driving motor 11 supplied with predetermined power operates At this time, while the RPM and torque displayed on the A/D converter 42 or the computer system 43 are confirmed step by step, the load proper to the navigation condition is provided to the differential gear by using a brake operation knob 22.

In this case, the differential assembly generates a noise. The sound level meter 30 senses the noise, and applies the noise to the frequency analyzer 31 as the electrical signal. The frequency analyzer 31 receives the output signal from the sound level meter 30, and then outputs data responsive to the noise (such as a frequency, a wavelength, and the like) as a transfer function and an auto spectrum.

The user compares the data with the torque and RPM confirmed by the A/D converter 42, and thus finds the accurate data responsive to the noise from the differential assembly according to various navigation conditions.

As a result, the noise measuring device according to the present invention separates the noise of the differential assembly from other noise during the vehicle's running thereby accurately analyzing and measuring each noise from every part with respect to a variable position of the sound level meter changes.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A noise measuring device for a differential gear assembly which generates a noise under simulated driving conditions, comprising a fixed jig for fixing front and rear parts of the differential gear assembly having a differential gear;

a driving motor for rotating a drive shaft of said differential gear;

a torque sensor and a revolutions per minute (RPM) sensor attached between said drive shaft and said driving motor;

a computer displaying torque and RPM of said drive shaft after receiving through an analog-to-digital (A/D) converter signals from said torque sensor and said RPM sensor;

an analog-to-digital (A/D) converter, connected to said torque sensor and RPM sensor, for conveying a signal to said computer representative of torque and RPM;

braking means for providing a load to a driven shaft of said differential gear;

a sound sensing means installed adjacent said differential gear for generating an electrical signal proportional to a magnitude of said noise; and a frequency analyzer which receives an output signal from said sound sensing means to analyze a characteristic of sound from said sound sensing means;

wherein said braking means includes a brake drum coupled with said drive shaft as one body;

a brake lining for covering a peripheral surface of said brake drum; and a brake controller which provides a load to said differential gear by imparting a tensile stress to said brake lining.

* * * * *